(12) United States Patent
Babington (10) Patent No.: US 6,176,233 B1
(45) Date of Patent: Jan. 23, 2001

(54) POWERED MULTI-FUEL BURNER FOR FIELD COOKING

(75) Inventor: Robert S. Babington, 1113 Ingleside Ave., McLean, VA (US) 22101

(73) Assignee: Robert S. Babington, McLean, VA (US)

( * ) Notice: Under 35 U.S.C. 154(b), the term of this patent shall be extended for 0 days.

(21) Appl. No.: 09/389,088

(22) Filed: Aug. 2, 1999

(51) Int. Cl.⁷ ...................................................... F24C 15/10
(52) U.S. Cl. .................. 126/37 B; 126/37 R; 126/39 C; 431/155; 431/160
(58) Field of Search .............................. 126/39 R, 39 C, 126/41 R, 39 B, 38, 39 K, 37 B, 37 C, 37 A, 275 R, 116 R; 431/265, 159, 160, 155, 154

(56) References Cited

U.S. PATENT DOCUMENTS

| | | | |
|---|---|---|---|
| 1,838,903 | * 12/1931 | Buschow | 431/160 |
| 2,391,460 | * 12/1945 | Howard | 126/39 C |
| 4,092,973 | * 6/1978 | Bernazzani | 126/37 B |
| 5,368,011 | * 11/1994 | Bodner | 126/116 R |

FOREIGN PATENT DOCUMENTS

1116241 * 5/1956 (FR) ...................................... 431/155

* cited by examiner

Primary Examiner—James C. Yeung
(74) Attorney, Agent, or Firm—Pollock, Vande, Sande & Amernick, RLLP (57) ABSTRACT

A powered multi-fuel burner for heating a heating cabinet of a cooking station. A frame provides first and second lateral skids which are spaced apart to be received on first and second lateral brackets in the heating cabinet. The frame includes first and second feet on a side of the frame which extends out of the cabinet when it is inserted. A plenum supported on the front end of the frame has an insulated interior, and an exterior apertured surface facing each of the cooking stations in the heating cabinet. A burner assembly has a flame tube which is inserted through a convective air current into the plenum. The burner produces a flame which is spread by the plenum, but which produces no flame through the apertured surfaces. The multi-fuel burner may be used inside or outside of the heating cabinet for diverse cooking applications.

13 Claims, 7 Drawing Sheets

POWERED MULTI-FUEL BURNER FOR FIELD COOKING

BACKGROUND OF THE INVENTION

The present invention relates to mobile cooking systems used to feed large numbers of people in the field. Specifically, a burner system which utilizes a multi-fuel burner is provided for providing a portable source of heat for a variety of cooking applications and sanitary applications.

The operational effectiveness of a military unit when on maneuvers depends upon successfully feeding a large number of personnel in the field. Various cooking stations and equipment for sanitizing cooking utensils have been developed for this purpose which are portable and field-ready. One such system in widespread use is the M-59 Field Range. The Field Range comprises a heating cabinet with a vertical column of cooking stations, one of which is dedicated to baking, one to frying and one for heating containers of liquid. In the past, a single gasoline fuel burner has been used to supply heat to the M-59 Field Range which is positioned in one of two vertical locations within the M-59 Field Range Heating Cabinet, depending on the particular cooking task.

The M-59 Field Range heating cabinet and its burner, known as the M2 burner, while providing satisfactory utility in the field, has its limitations. For instance, when heating large containers, such as a fifteen gallon stock pot, the heat output from the burner, and heat transfer between the burner and the heating cabinet is low, which disadvantageously increases the time for heating the pot to a cooking temperature.

The previous gasoline fired M2 burners also provide significant safety issues for personnel using the M-59 Field Range. When moving the gasoline fired burner of the prior art, the device must be cooled down before it can be refueled, or repositioned within the M-59 heating cabinet. Accordingly, a burner which uses a less volatile fuel is desirable to facilitate use of the heater in a safe manner.

SUMMARY OF THE INVENTION

It is a primary object of this invention to provide a powered multi-fuel burner which may be used in a cooking and heating appliance, or operated as a stand-alone cooking and heating appliance.

In carrying out the invention, a frame is provided which may be positioned conveniently in an existing heating cabinet of a field cooking facility, or may be supported on a surface as a stand-alone device. A heat plenum is located at one end of the frame, and a front side of the heat plenum receives a flame tube from a burner assembly. The top of the heat plenum has an apertured surface which functions as a flame spreader, emitting hot gases, but no flame, to produce cooking heat without producing soot on any adjacent surface.

The burner assembly is supported on the opposite end of the frame. A flame tube of the burner extends within the insulated surfaces of the fire box. The burner assembly is separated from the burner box by a convective air curtain, which directs heat from the plenum away from the burner assembly.

In a preferred embodiment of the invention, the frame has a width for being supported within the bottom of a conventional heating cabinet of a cooking station. When not in use in the heating cabinet, the frame includes feet which will support the powered multifuel burner above ground where it can be used as a direct source of heat in a variety of cooking and sanitizing operations.

DESCRIPTION OF THE PREFERRED EMBODIMENTS

Figure 1:
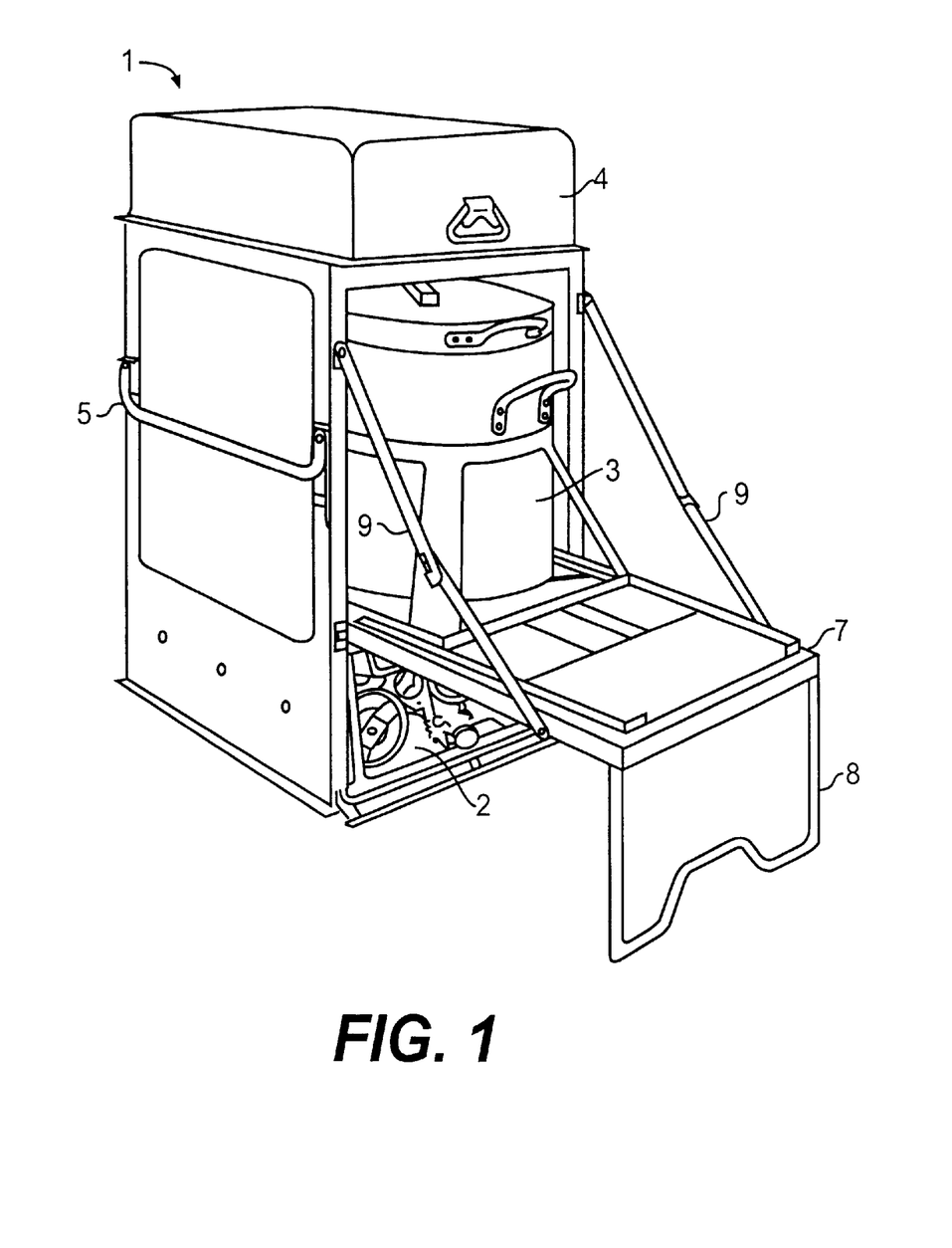
FIG. 1 is an isometric view of the prior M-59 cooking range.

FIG. 1 illustrates the prior art M-59 Field Range Heating Cabinet used by the U.S. military. The range includes a generally vertical cabinet 1, which provides a plurality of cooking stations positioned vertically above a burner unit 2. The burner unit 2 is the M2 conventional gasoline-fired vaporizing type burner which provides heat output along the vertical axis of heating cabinet 1. Shown in FIG. 1 is the position for heating a large stock pot 3 having a bottom closely positioned to the heating surface of heater 2. Given the heat output for the conventional burner 2, the bottom of the pot 3 must necessarily be as close as possible to the heated surface in order to heat in a reasonable amount of time.

Various cooking positions within the vertical height of heating cabinet 1 provide for heating the contents of a pot 3, a baking position, a frying position, and a roasting position underneath lid 4. When roasting lid 4 is removed, a pan within the lid is used to fry items, or may be used to bake items placed in the pan on a grill surface.

The M-59 Field Range Heating Cabinet includes two handles, one of which, 5, is shown. The burner 2 is removable from the station shown in FIG. 1 by pulling the unit forward so that it's frame, sliding along a pair of brackets on each lateral side of the heating cabinets clears the heating cabinet. In order to increase the available heat from the M2 burner, the burner may be positioned higher in the cabinet 1. As noted previously, the device is a gasoline-fired device, and care in handling it during refueling or repositioning the device to a location higher in the vertical cabinet must be done at cooler temperatures to avoid a fire or explosion. During the stock pot heating operation, leg 8 is folded out as shown to insert or remove the pot, and with the assistance of straps 9 maintained in operational use. During transport, the fold-out table section 7 is folded to close the opening in the heating cabinet 1.

Figure 2:
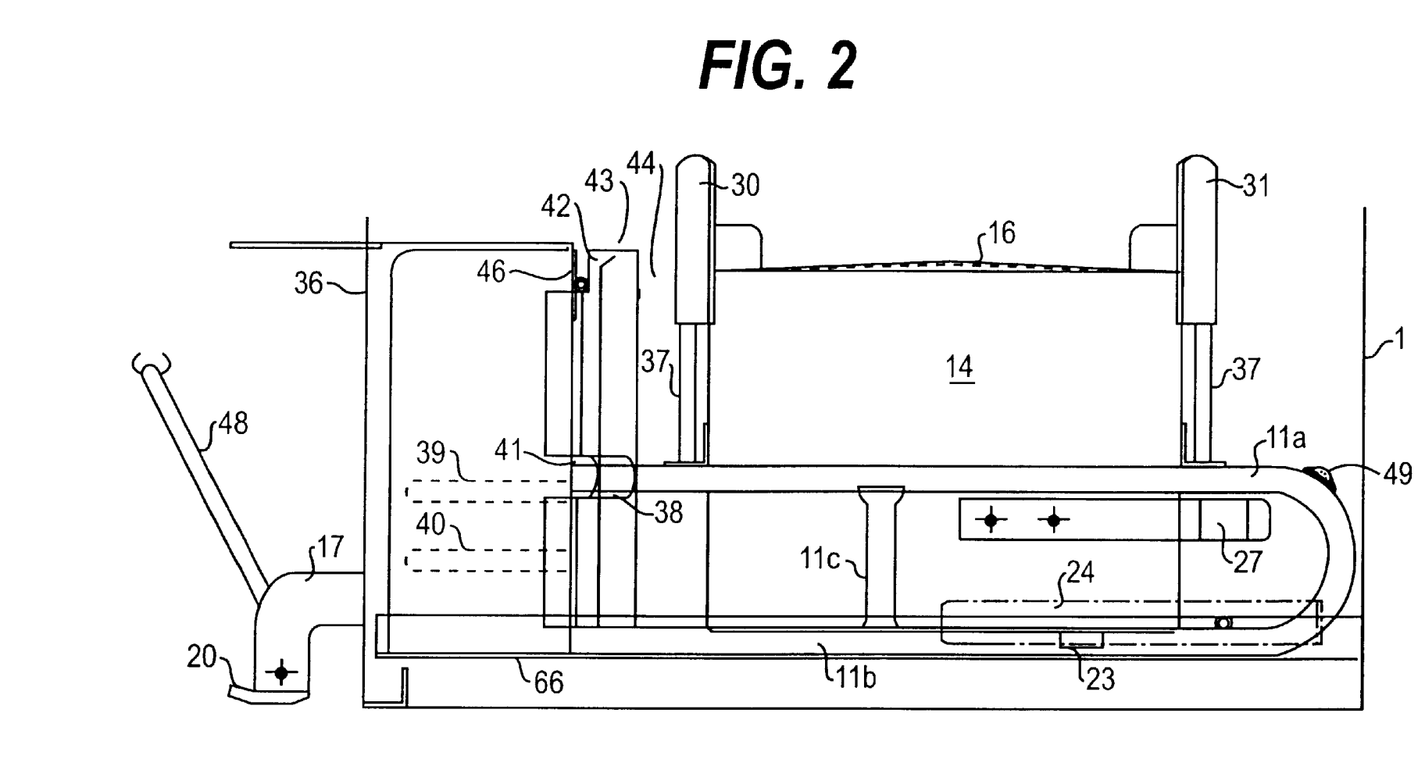
FIG. 2 is a side view of the burner assembly for a M-59 Field Range in accordance with the preferred embodiment of the present invention.
Figure 3:
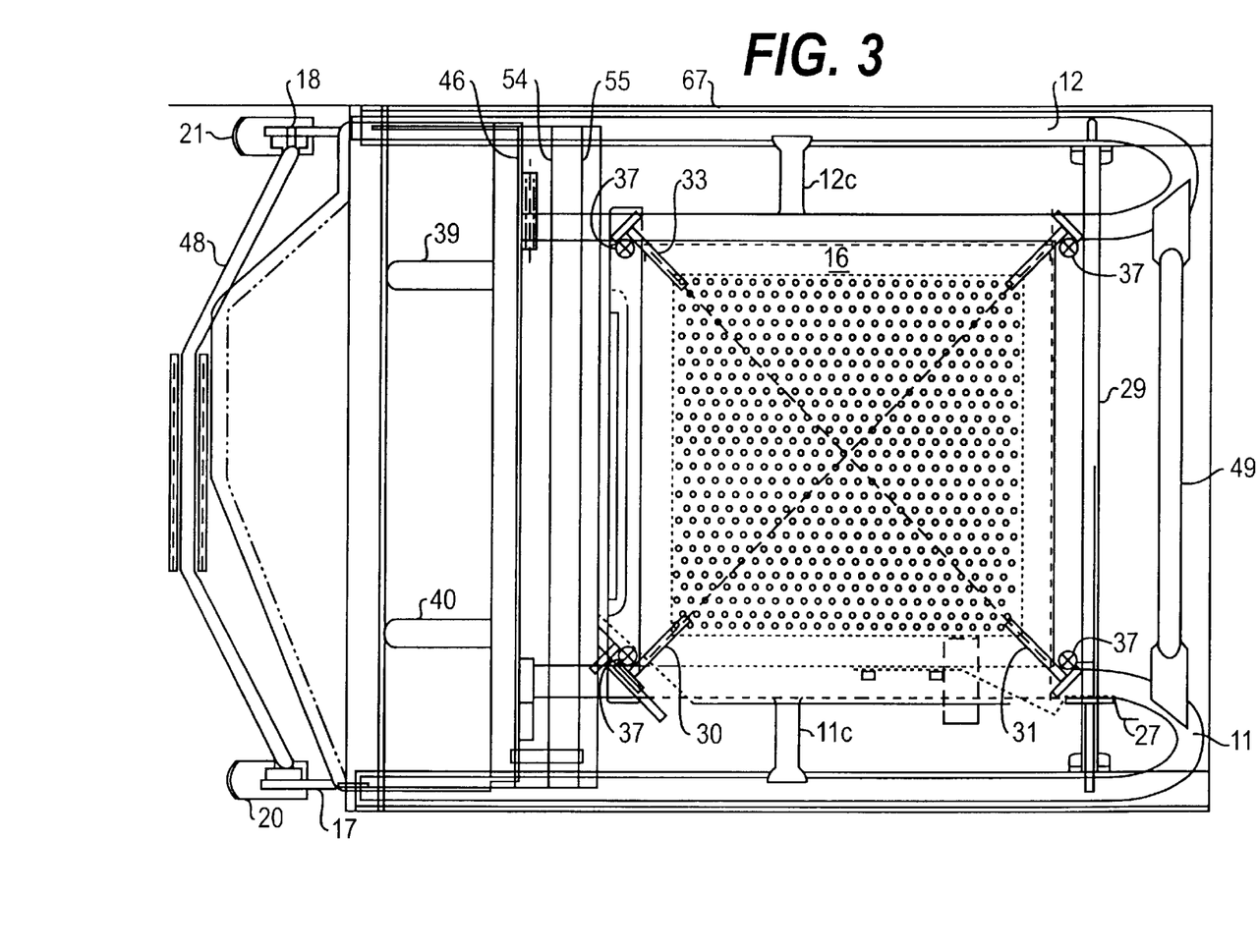
FIG. 3 is a top view of the burner assembly, illustrating the apertured surface of the plenum.
Figure 4:
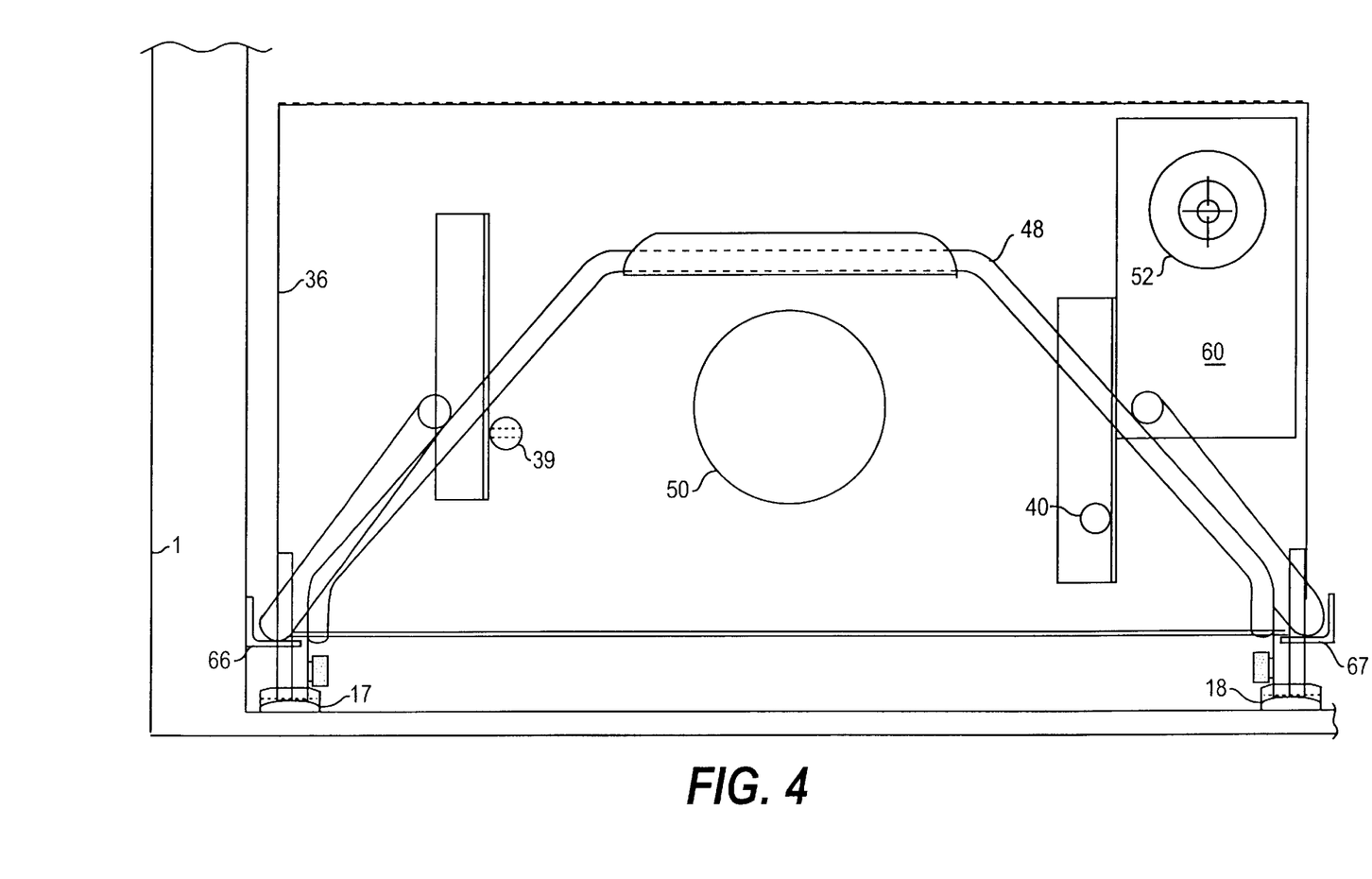
FIG. 4 is an end view of the device without the burner installed.

FIGS. 2–4 illustrate the overall assembly of the multi-fuel burner in accordance with the preferred embodiment of the present invention inserted within a heating cabinet 1 of the M-59 Field Range Heating Cabinet in place of the prior art M2 burner.

The M-59 Field Range Heating Cabinet 1 includes a pair of angle brackets 66 and 67 in a bottom compartment onto which a frame of the multi-fuel burner is slid. The multi-fuel burner may also be operated outside of the heating cabinet, as will be described, to provide direct heating of a stock pot or other cooking utensil.

The burner includes a plenum 14 which has interior walls as well as a bottom covered with an alumina silica insulation. A top apertured surface 16 provides convective heat as well as radiant heat generated from the flame introduced into the plenum 14.

The plenum 14 is supported on a pair of skids 11 and 12 which are shown to include an upper and lower portion 11A, 11B and 12A, 12B joined together with braces 11C and 12C. The bottom sections of the frame 11B and 12B are welded to supports 17, 18, which have feet 20 and 21, and extend rearwardly outside of the cabinet 1. When in the M-59 Field Range Heating Cabinet the feet 24, 25, located at the forward end of the frame, are pushed into a horizontal, non-supporting position by rotation of the handle 28, as will be described more completely with respect to FIG. 6. Feet 20 and 21 are raised off the ground because of the height of brackets 66, 67.

The plenum 14 apertured surface 16 provides direct convective and radiation heat to vertically stacked cooking compartments within the M-59 Field Range Heating Cabinet. Alternatively, when the burner is removed from the M-59 Field Range Heating Cabinet, feet 24, 25 are positioned into catch 27, and support along with feet 20, 21 the burner on the ground. A stock pot or other cooking utensil may be supported on pot guides 30–33 over the apertured surface 16. The guides 30, 31, 32 and 33, are disposed on the circumference of the apertured heating surface 16. Each of the pot guides may be positioned between a pair of studs 16A, 16B, on each corner of the apertured surface 16. When in the M-59 Field Range Heating Cabinet, the guides 30–33 are rotated out of position, and slide along vertical supports 37 so that they are below the apertured surface 16.

A burner 61 (not shown in FIG. 1, but shown in FIG. 5) is slid over two support pins 39 and 40, so that a flame tube of the burner 61 is inserted through fire wall 46 and a series of convective air curtains 42, 43 and 44, into a hole in the front wall of plenum 14 which faces fire wall 46. The convective air curtains 42, 43 and 44 divert heat emanating from fire box 14 away from the fire wall 46, to thermally insulate the burner and its control electronics from the remaining portion of the burner assembly.

A handle 48, located at the rearward end of the frame, and a handle 49 at the front end of the frame, make handling of the burner assembly easy for the personnel involved in the installation process.

As shown in FIG. 4, the two pins 39 and 40, welded to fire wall 46, receive corresponding holes on the face of the burner 61 saddle, and a burner tube 62 enters the hole 50 in the fire wall 46. Control electronics 60 are associated with the burner 61, and provide on and off control of the burner in response to a thermostat 52 in the control electronics 60. The burner 61 and control electronics 60 are partially enclosed by fire wall 46 and housing 36. Housing 36 has a top hinged to fire wall 46 to permit easy access to the burner 61 when the burner is removed from cabinet 1.

The burner 61 and control electronics 60 suitable for this application is available as the Babington 2000 Multi-Fuel Burner. The burner has a firing rate under control of the thermostat 52 of control electronics 52 to allow cooking at a variety of temperatures. The Babington 2000 Multi-Fuel Burner will burn a variety of fuels, including the commonly available J-8 diesel-type fuel. Use of the foregoing burner avoids the use of a vaporous gas, such as gasoline, avoiding the previously noted safety issues for personnel using the prior art M-59 Field Range Heating Cabinet.

Figure 5:
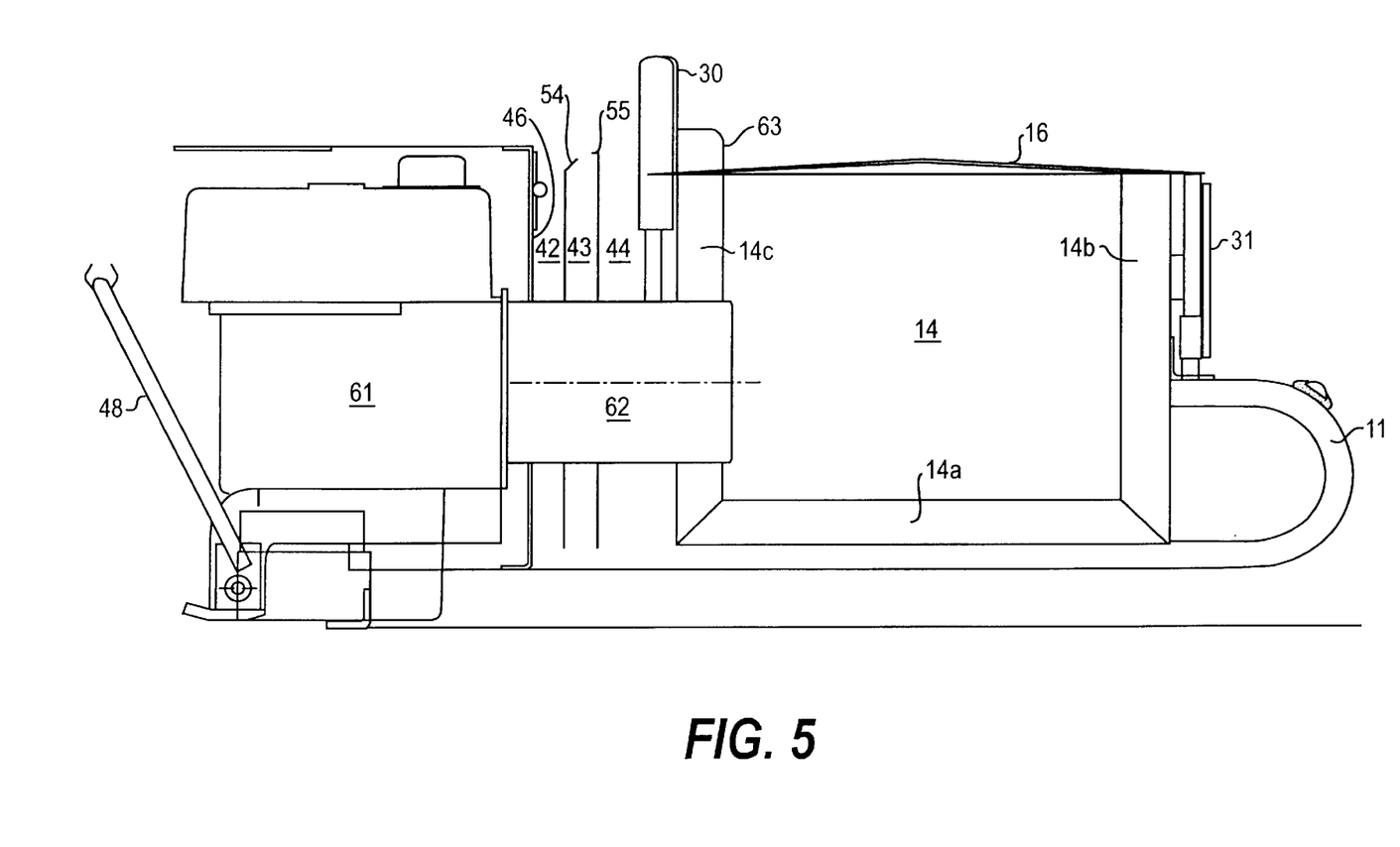
FIG. 5 is a section view of the device of FIG. 1.

Each of the convective air curtains is shown more particularly in a section view of FIG. 5. A first air curtain 42 is provided by the fire wall 46 and baffle 54. Baffle 54 is a planar sheet of stainless steel which, with baffle 55, form a second convective air curtain 43. Convective air curtains 42 and 43 are closed on the lateral edges thereof by stainless steel walls which have openings 38, 41, shown more particularly in FIG. 2, permitting air to circulate through openings 38, 41 through an open top of each convective curtain 42 and 43. Convective air curtain 44 is effected from the space, open on three sides, between baffle 55 and the plenum 14 front wall.

The burner 61 has a flame tube 62 inserted through the front wall of the plenum 14 and through each of the air curtains 42, 43 and 44. Plenum 14, as shown in section view of FIG. 5, includes interior surfaces 14A, 14B, and 14C insulated with a material such as alumina silica.

The flame produced from the Babington 2000 Multi-Fuel Burner is spread within the plenum 14, and apertured surface 16, which may be for high temperature operation made of hastalloy steel. The flame produced from flame 62 is spread by the apertured surface 16, and confined to the interior of plenum 14. Using the foregoing Babington 2000 Multi-Fuel Burner, combustion is complete so that no carbon particles are produced which would generate soot to any surface in contact with the apertured surface 16.

The foregoing air curtains 42, 43 and 44 maintain the temperature at the burner assembly, including burner 61 and control electronics 60, at a temperature safe for operating personnel.

As shown in FIGS. 2 and 3, the unit slides in the lower position of the M-59 Field Range Heating Cabinet along a pair of brackets 66 and 67. The feet 24, 25 on the front of the frame are in the retracted position, while the feet 20 and 21 are supported above the ground. Feet 20, 21 maintain the burner assembly above the ground so that the burner does not bottom out when being removed from the cabinet 1.

Shown also in FIG. 5 is a heat guard 63 hinged to the front edge of surface 16, rotated into place when the burner unit is utilized outside of the M-59 Field Range Heating Cabinet and a cooking utensil such as a stock pot is placed on guides 30–33. As heat would be directed between surface 16 and the pot bottom, toward the personnel using the device, the heat guard 63 when folded into place reduces the amount of heat which would necessarily be directed rearwardly toward the user.

Figure 6:
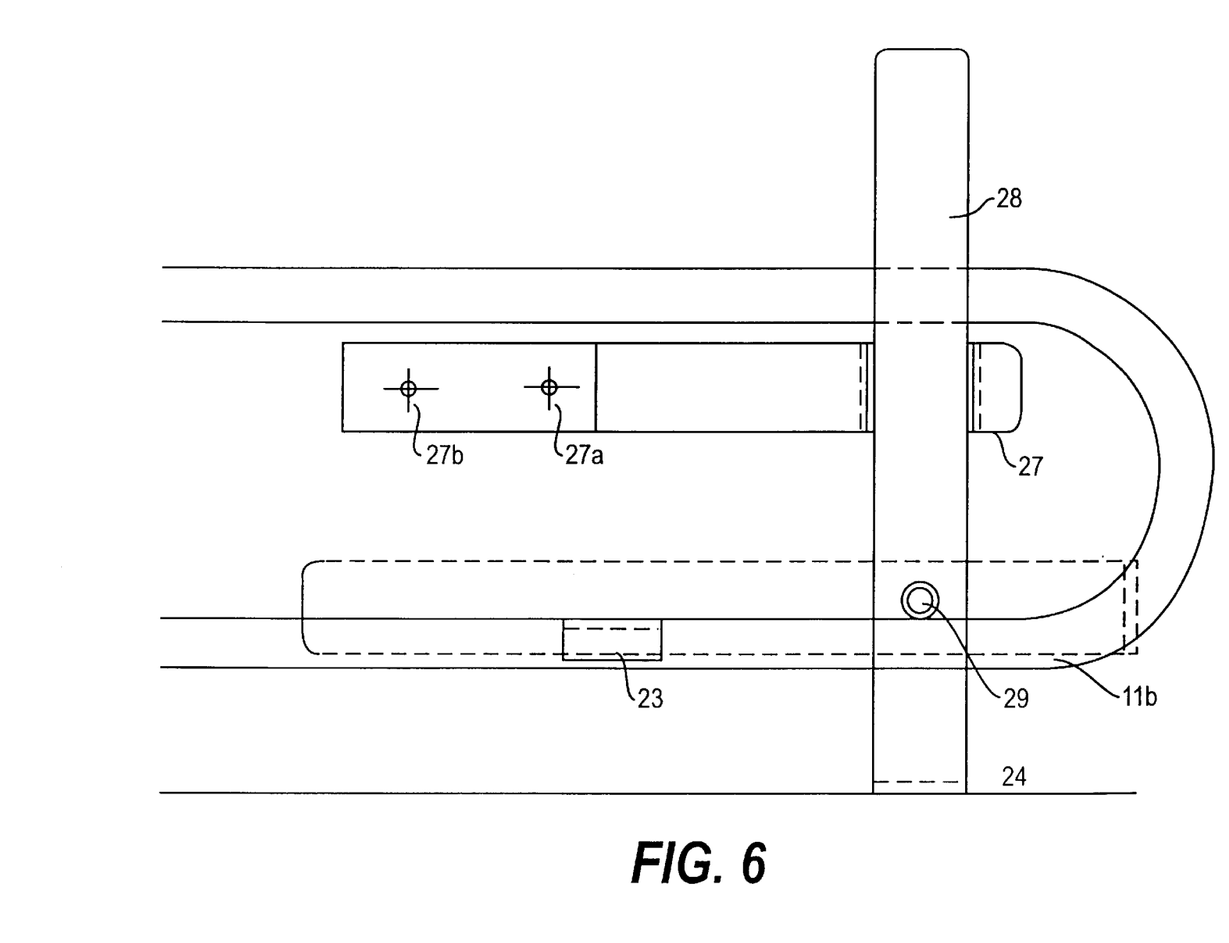
FIG. 6 illustrates the folding feet on the front section of the frame.
Figure 7:
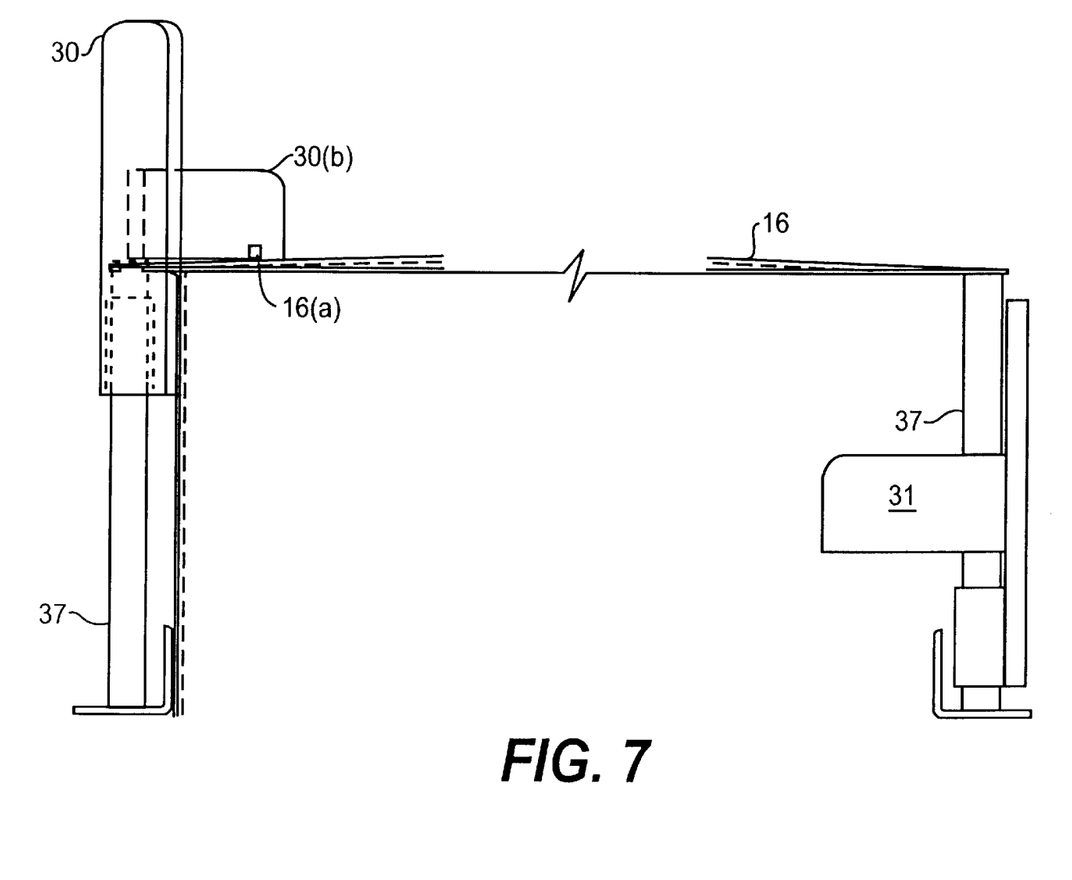
FIG. 7 illustrates the stock pot supports for positioning a stock pot above the apertured surface of the plenum.

Two of the features which facilitate the use of the burner assembly, as both a heating unit for the M-59 Field Range Heating Cabinet and other cooking and heating appliances, as well as a stand alone heating appliance, are shown more particularly in FIGS. 6 and 7. Referring now to FIG. 6, one of two folding feet 24 is shown in the erect position for supporting the burner as a stand alone cooking appliance. The foot 24 is connected to an axle 29, traversing the lower frame sections 11B and 12B. Catch 27 includes a U-shaped portion which holds a handle 28 in the vertical position when it is deflected in response to rotation of foot 24 and handle 28. The catch 27 is supported to the plenum by a pair of welds 27B and 27A. When lowered to be inserted in the M-59 Field Range Heating Cabinet, the handle support 23 contains the handle 28 and foot 24 in the horizontal position shown in phantom.

FIG. 7 illustrates another feature which facilitates use of the burner as a stand alone cooking appliance. Along the four corners of the apertured surface 16 are the pot guides 30, 31, 32 and 33. Pot guide 30 is shown in its deployed position, having a guide surface 30B which supports a pot, or frying surface over the heated surface 16. The guide 30B is maintained in position by a pair of bosses 16A, 16B in the surface of heating surface 16. Thus, the pot is maintained from moving laterally across the curved surface of heating surface 16.

When used in the M-59 Field Range Heating Cabinet the guide 30 may be rotated so that the guide surfaces 30B, 31B, 32B and 33B clear the top of the surface 16, and is permitted to slide along vertical support 37, as shown by guide 31 in the right hand side of FIG. 7. Guides 30–33 then assume a position below the surface 16, permitting the burner to be slid into the M-59 Field Range Heating Cabinet.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A powered multi-fuel burner comprising:
a frame supported by a plurality of feet above a support surface having first and second rail members constituting lateral sides which are spaced a distance to be received in a slot of a cabinet which provides multiple cooking stations;
a heat plenum located at one end of said frame, said heat plenum having on a front side thereof a hole facing an opposite end of said frame, and including an apertured surface which emits heat from a flame inside of said plenum;
means for generating a convective air curtain opposite said front side of said heat plenum; and
a burner assembly supported on an opposite side of said convective air curtain, having a flame tube extending through said convective air curtain into said hole of said heat plenum front side, introducing heat into said plenum which escapes through said apertured surface.

2. The powered multi-fuel burner according to claim 1, wherein at least two of said feet are supported to said frame for rotation to a position of non-support.

3. The powered multi-fuel burner according to claim 1, further comprising:
a plurality of guides located about the periphery of said heated surface, said guides being supported for movement along sides of said plenum to a position above said plenum where they can be rotated into position for supporting a cooking utensil on said apertured surface.

4. The powered multi-fuel burner according to claim 1, wherein interior surfaces of said plenum are insulated.

5. The multi-fuel burner according to claim 1, wherein said means for generating a convective air curtain includes first and second spaced apart metal surfaces, having a hole to receive said burner flame tube, said metal surfaces being closed along lateral edges thereof and at least partially open along top edges of said metal surfaces, said closed lateral edges including air passages, whereby an air current passes through said air passages out through said partially open top edges.

6. The powered multi-fuel burner according to claim 1, further comprising a heat guard extending from a front side of said plenum above said apertured surface for directing heat from said apertured surface away from said burner assembly.

7. A powered multi-fuel burner according to claim 1, further comprising a housing adjacent said means for generating a convective air current for enclosing said burner assembly.

8. A powered multi-fuel burner for a heating cabinet having multiple cooking stations arranged in a vertical column, comprising:
a frame comprising first and second lateral skids which are spaced apart a distance to be received on a first and second lateral brackets in said heating cabinet, and having first and second feet on a side of said frame which extends out of said cabinet;
a plenum supported on a front end of said frame, having an insulated interior, and an exterior apertured surface facing said cooking stations; and
a burner assembly connected to said frame facing an opening in said plenum and separated from said plenum by a convective air curtain which reduces heat transferred from said plenum to said burner assembly, said burner assembly having a flame tube which extends through said convective heat curtain into said plenum.

9. The powered multi-fuel burner according to claim 8, further comprising a housing for partially enclosing said burner assembly.

10. The powered multi-fuel burner according to claim 8, further comprising third and fourth feet which are supported to a side of said frame opposite said side extending out of said cabinet, and which are rotatable to a position on non-support when said frame is being supported by said lateral brackets.

11. The powered multi-fuel burner according to claim 8, further comprising a handle connected across said frame adjacent said burner assembly for facilitating sliding said frame into said heating cabinet.

12. A powered multi-fuel burner comprising:
a frame supported by a plurality of feet above a support surface;
a heat plenum located at one end of said frame, said heat plenum having on a front side thereof a hole facing an opposite end of said frame, and including an apertured surface which emits heat from a flame inside of said plenum;
means for generating a convective air curtain opposite said one side of said heat plenum;
a burner assembly supported on an opposite side of said convective air curtain, having a flame tube extending through said convective air curtain into said hole of said heat plenum front side, introducing heat into said plenum which escapes through said apertured surface and
a plurality of guides located about the periphery of said heated surface, said guides being supported for movement along sides of said plenum to a position above said plenum where they can be rotated into position for supporting a cooking utensil on said apertured surface.

13. The powered multi-fuel burner according to claim 12, further comprising a heat guard extending from a front side of said plenum above said apertured surface for directing heat from said apertured surface away from said burner assembly.

* * * * *